(12) United States Patent
Chao et al.

(10) Patent No.: US 9,058,702 B2
(45) Date of Patent: Jun. 16, 2015

(54) METHOD FOR SECURELY DELIVERING INDOOR POSITIONING DATA AND APPLICATIONS

(71) Applicant: QUALCOMM Incorporated, San Diego, CA (US)

(72) Inventors: Hui Chao, San Jose, CA (US); Jiajian Chen, San Jose, CA (US); Saumitra Mohan Das, Santa Clara, CA (US); Ayman Fawzy Naguib, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 146 days.

(21) Appl. No.: 13/798,068

(22) Filed: Mar. 12, 2013

(65) Prior Publication Data

US 2014/0266585 A1 Sep. 18, 2014

(51) Int. Cl.
| | |
|---|---|
| H04W 4/04 | (2009.01) |
| G07C 9/00 | (2006.01) |
| G01C 21/20 | (2006.01) |
| H04W 4/00 | (2009.01) |
| H04W 4/02 | (2009.01) |
| H04W 12/06 | (2009.01) |
| H04W 12/08 | (2009.01) |
| G01S 19/05 | (2010.01) |

(52) U.S. Cl.
CPC ........... *G07C 9/00111* (2013.01); *H04W 4/043* (2013.01); *H04W 4/04* (2013.01); *G01S 19/05* (2013.01); *G01C 21/206* (2013.01); *G07C 9/00103* (2013.01); *H04W 4/001* (2013.01); *H04W 4/008* (2013.01); *H04W 4/02* (2013.01);
(Continued)

(58) Field of Classification Search
CPC ...... G01C 21/206; H04W 4/043; H04W 4/04; G01S 19/05
USPC .................... 340/5.61, 5.7; 455/456.3, 456.1; 345/419; 701/434, 433
See application file for complete search history.

(56) References Cited

U.S. PATENT DOCUMENTS

| | | |
|---|---|---|
| 8,115,680 B2 | 2/2012 | Kalliola et al. |
| 8,320,939 B1 | 11/2012 | Vincent |

(Continued)

FOREIGN PATENT DOCUMENTS

| | | |
|---|---|---|
| EP | 2085934 A1 | 8/2009 |
| WO | WO-2004040923 A1 | 5/2004 |
| WO | WO-2010059934 A2 | 5/2010 |

OTHER PUBLICATIONS

International Search Report and Written Opinion—PCT/US2014/019369—ISA/EPO—Jun. 18, 2014.

*Primary Examiner* — Andrew Bee
(74) *Attorney, Agent, or Firm* — Kilpatrick Townsend & Stockton LLP

(57) ABSTRACT

Methods and devices are described for providing localized secure navigation in conjunction with near field communication access control systems. In one potential embodiment, a mobile device such as a cell phone may communicate with a door access control point using near field communication to receive location access system information. The mobile device may then authorize download and execution of a local secure navigation module from a location access system using the location access system information for use in receiving location assistance data, based on an authentication level associated with the mobile device. Such location assistance data may be used by the local secure navigation module to provide location assistance when the mobile device is in a secure location. The location of the mobile device may then be tracked using at least the location assistance data and the communication with the door access control point.

33 Claims, 8 Drawing Sheets

(52) U.S. Cl.
CPC ........... *H04W 12/06* (2013.01); *G07C 2209/04* (2013.01); *H04W 12/08* (2013.01)

(56) References Cited

U.S. PATENT DOCUMENTS

| | | | |
|---|---|---|---|
| 2006/0135183 A1* | 6/2006 | Zavada et al. | 455/457 |
| 2008/0082258 A1* | 4/2008 | Pham et al. | 701/206 |
| 2010/0121567 A1* | 5/2010 | Mendelson | 701/206 |
| 2010/0331016 A1 | 12/2010 | Dutton et al. | |
| 2011/0093928 A1 | 4/2011 | Nakagawa et al. | |
| 2011/0311052 A1 | 12/2011 | Myers et al. | |
| 2012/0095678 A1* | 4/2012 | Moore et al. | 701/434 |
| 2012/0252480 A1 | 10/2012 | Krutt et al. | |
| 2012/0280784 A1 | 11/2012 | Gaviria et al. | |
| 2013/0211718 A1* | 8/2013 | Yoo et al. | 701/500 |
| 2013/0253818 A1* | 9/2013 | Sanders et al. | 701/419 |

* cited by examiner

METHOD FOR SECURELY DELIVERING INDOOR POSITIONING DATA AND APPLICATIONS

BACKGROUND

Aspects of the disclosure relate to networked computing technologies and location services. In particular, aspects of the disclosure relate to systems, methods, apparatus, and computer readable media for providing secure positioning data using near field communications (NFC) in conjunction with door access control points.

Many locations are protected by location access systems. Such systems often use key cards or badges with near field communication module to provide secure access to the secure location. Integration of near field communication modules as part of a smart phone may enable a phone to function as a badge to allow access to a secure location, and to provide secure location assistance and maps only while the user is within the secure location.

Additionally, mobile electronic devices with the capability to output information regarding the location of the mobile device and the mobile device's user, along with associated network based positioning systems, are becoming more and more widespread in today's society. For example, people use cellular phones, smart phones, personal digital assistants, laptop computers, pagers, tablet computers, and other such devices to send and receive data wirelessly from countless locations. Advancements in wireless communication technology have aided in the use of networks to create and use location information created via interaction between the wireless networks and the mobile devices. Location assistance services may use such information to provide assistance to mobile device users. While location assistance data from such services is often available for public areas and general map locations, assistance within buildings is often not available. In certain instances, the information may not be available due to security concerns associated with an indoor location.

BRIEF SUMMARY

Various embodiments are described herein related to systems, methods, apparatus, and computer readable media for providing secure positioning data using NFC in conjunction with door access control points. One potential embodiment is a method comprising: communicating, using a near field communication module of a mobile device, with a door access control point to receive location access system information; authorizing, at the mobile device, download and execution of a local secure navigation module from a location access system using the location access system information; receiving, at the mobile device, location assistance data based on an authentication level associated with the mobile device for use with the local secure navigation module to provide location assistance for the secure location at the mobile device; and tracking a location of the mobile device using at least the location assistance data and the communication with the door access control point. Further embodiments of such a method may also include receiving, at the mobile device, an identification associated with the location access system and the authentication level associated with the mobile device.

Additional embodiments of such a method may function where receiving the location assistance data based on the authentication level comprises receiving a map with a level of detail that matches the authentication level, wherein a higher authentication level is associated with a greater level of detail.

Additional embodiments of such a method may also include communicating, using the near field communication module of the mobile device, the identification to the door access control point associated with a first door of the secure location to open the first door. Additional embodiments of such a method may also include communicating, using the near field communication module of the mobile device, the identification to a second door access control point associated with a second door of the secure location to request the second door to open; and receiving an indication that access to an area behind the second door is denied to due to an insufficient authorization level. Additional embodiments of such a method may also include tracking, using the location access system, a travel path of the mobile device within the secure location.

Additional embodiments of such a method may also include determining that the mobile device is outside of an assistance area; and automatically deleting the local secure navigation module and the location assistance data from the mobile device in response to the determining that the mobile device is outside of the secure location.

Additional embodiments of such a method may function where determining that the mobile device is outside of an assistance area comprises communicating, with an exit door access control point, a request to exit a secure area.

Additional embodiments of such a method may also include communicating, using the near field communication module of the mobile device, with a second door access control point to receive second location access system information; and receiving updated location assistance information from the location access system in response to the communication with the second door access control point.

Additional embodiments of such a method may function where receiving updated location assistance information comprises receiving second map information for a second area and deleting first map information for a first area received as part of the location assistance data. Additional embodiments of such a method may function where the location access system information comprises an internet protocol address for a location system server; and where receiving location assistance data at the mobile device comprises communicating with a location access server via a wireless network access point. Additional embodiments of such a method may function where tracking a location of the mobile device using at least the location assistance data and the communication with the door access control point comprises using a known location of the door access control point with network assisted positioning information from a plurality of wireless network access points to track the location of the mobile device. Additional embodiments of such a method may function where tracking a location of the mobile device using at least the location assistance data and the communication with the door access control point comprises using a known location of the door access control point and map information with accelerometer data from an accelerometer in the mobile device to track a location of the mobile device.

An alternative embodiment may be implemented as a device. One implementation of such a device may comprise means for near field communication with a door access control point to receive location access system information; means for authorizing download and execution of a local secure navigation module from a location access system; means for receiving location assistance data based on an authentication level for use with the local secure navigation module to provide location assistance for the secure location at the mobile device; and means for tracking a location of the mobile device using at least the location assistance data and the communication with the door access control point.

Additional embodiments of such a method may include means for receiving, at the mobile device, an identification associated with the location access system and the authentication level associated with the mobile device. Additional embodiments of such a method may include means for determining that the mobile device is outside of an assistance area; and means for automatically deleting the local secure navigation module and the location assistance data from the mobile device in response to the determining that the mobile device is outside of the secure location.

Still another alternative embodiment may be a non-transitory computer readable instruction medium comprising computer readable instructions that, when executed by a process, cause a device to perform a method comprising: communicating, using a near field communication module of the mobile device, with a door access control point to receive location access system information; authorizing download and execution of a local secure navigation module from a location access system; receiving, at the mobile device, location assistance data based on an authentication level of the mobile device for use with the local secure navigation module to provide location assistance for the secure location at the mobile device; and tracking a location of the mobile device using at least the location assistance data and the communication with the door access control point. In additional such embodiments, the non-transitory computer readable instruction medium may function where the method further comprises: communicating, using the near field communication module of the mobile device, with a second door access control point to receive second location access system information; and receiving updated location assistance information from the location access system in response to the communication with the second door access control point.

Still further embodiments of such a non-transitory computer readable instruction medium may function where the updated location assistance information comprises a location of the second door access control point that provides location disambiguation for a map display of the local secure navigation module.

Another embodiment may be a mobile device comprising: a memory; a near field communications (NFC) transceiver coupled to the memory; and a processor coupled to the memory and the NFC transceiver, wherein the processor is configured to: communicate with a door access control point via the NFC transceiver to receive location access system information; authorize download and execution of a local secure navigation module from a location access system; receive location assistance data based on an authentication level for use with the local secure navigation module to provide location assistance for the secure location at the mobile device; and track a location of the mobile device using at least the location assistance data and the communication with the door access control point.

Additional such embodiments may further include a wireless transceiver coupled to the processor; where the processor is further configured to receive the location assistance via the wireless transceiver and to track the location of the mobile device via network assisted location measurements taken using the wireless transceiver. Additional embodiments of such a mobile device may function where the network assisted location measurements comprise round trip time measurements with at least one wireless network access point of the location access system.

Additional embodiments may function where determining that the mobile device is outside of an assistance area comprises communicating, with an exit door access control point, a request to exit a secure area.

Further embodiments may additionally include means for communicating, using the near field communication module, with a second door access control point to receive second location access system information; and means for receiving updated location assistance information from the location access system in response to the communication with the second door access control point.

Further embodiments may additionally include means for identifying a location of the door access control point and associating the location of the door access control point with the mobile device. Further embodiments may additionally include means for communicating a set of mobile device capabilities to the location access system. Further embodiments may additionally include means for tracking relative changes in the location of the mobile device.

Further embodiments may additionally include computer readable instructions which, when executed by a processor in a mobile device, cause the mobile device to: communicate, using a near field communication module, with a door access control point to receive location access system information; authorize download and execution of a local secure navigation module from a location access system; receive location assistance data, based on an authentication level of the mobile device, wherein the location assistance data is used by the local secure navigation module to provide location assistance when the mobile device is in a secure location; and track a location of the mobile device using at least the location assistance data and the communication with the door access control point. Further embodiments may additionally include a non-transitory computer readable instruction medium further comprising instructions that communicate a set of mobile device functionality to the location access system; and that track the location of the mobile device using functionality of the mobile device communicated to the location access system as part of the set of mobile device functionality.

Further embodiments may additionally function to identify that the mobile device is in an unauthorized location; and communicate an alert to the location access system. Further embodiments may additionally function to identify a location of the door access control point in a map of the local secure navigation module. Further embodiments may additionally function to track relative motion of the mobile device using accelerometer data and update a mobile device position on the map of the local secure navigation module using the accelerometer data.

Additional embodiments may function where the network assisted location measurements comprise round trip time measurements with at least one wireless network access point of the location access system; and wherein the mobile device communicates a round trip time capability to the location access system prior to receiving the location assistance.

Additional embodiments may function where tracking the location of the mobile device using at least the location assistance data and the communication with the door access control point comprises taking a single positioning measurement of the mobile device. Additional embodiments may function where the single positioning measurement of the mobile device is taken in response to a user request for position information.

While various specific embodiments are described, a person of ordinary skill in the art will understand that elements, steps, and components of the various embodiments may be arranged in alternative structures while remaining within the scope of the description. Also, additional embodiments will be apparent given the description herein, and thus the description is not referring only to the specifically described embodiments, but to any embodiment capable of the function or structure described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
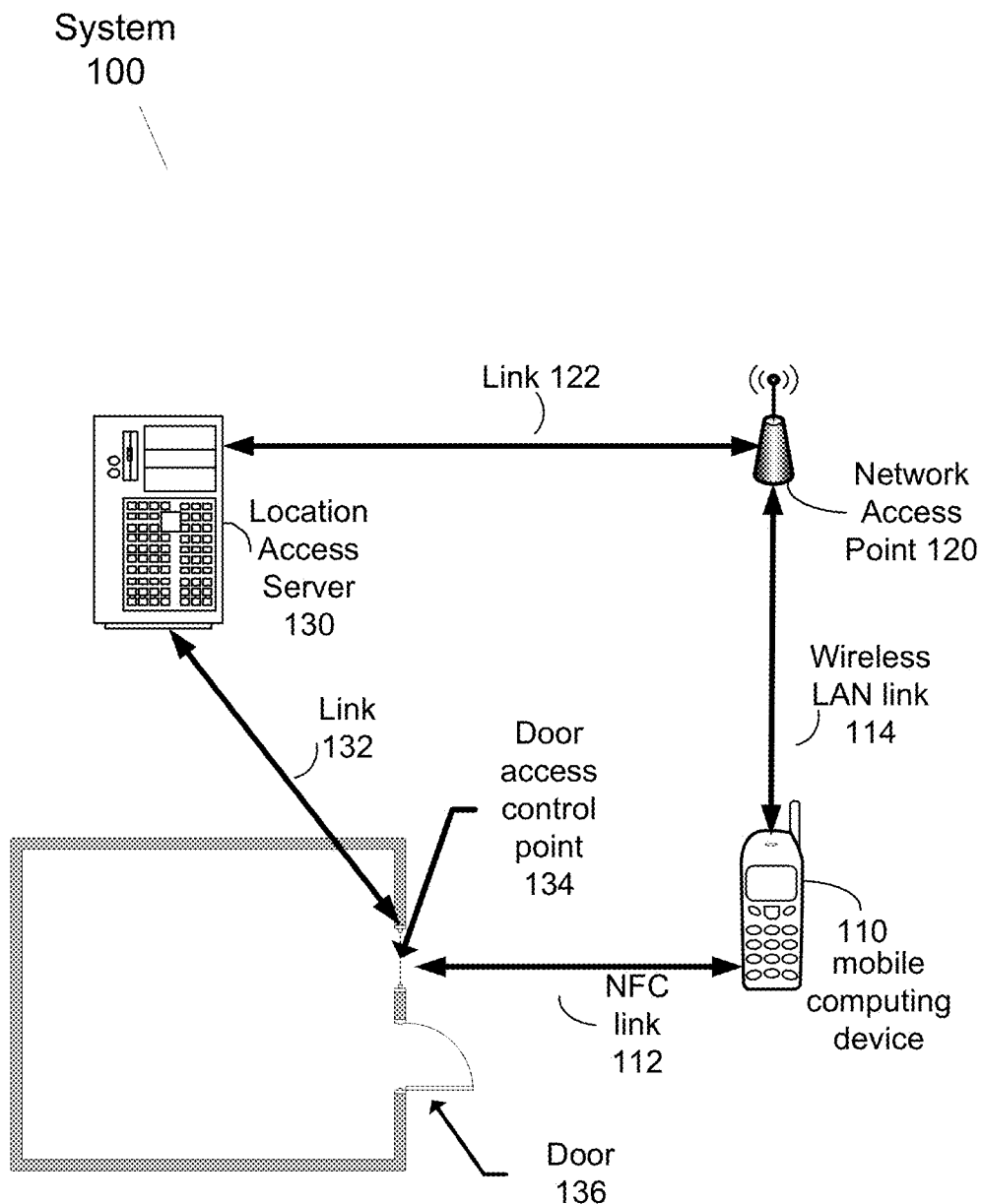
FIG. 1 is a system diagram for one potential embodiment.

Embodiments disclosed herein related to systems for providing location access services in conjunction with device tracking to determining a position and movement of an electronic device.

For example, in one potential embodiment, a user with a mobile phone a may enter a reception area and provide identification indicating that the user is expected within the secure location. The user may tag a phone having near field communication functionality to a part of an access system to receive authorization to enter the secure location. The user may then approve download and operation of an application that will provide location assistance within the secure location based on the access level associated with the user. This may include receiving information on the location of a server computer where the application may be retrieved, as well as an identifier for the mobile phone.

The mobile phone then sends a request to a server using a wireless connection to a network. The communication may be sent with the identifier indicating an authentication level for the mobile device. The server then sends the mobile phone the application, along with assistance data based on the user's authentication level. For example, based on the authentication level, the assistance data may provide details in certain parts of the secure location, but no details of another part of the secure location. Additionally, certain labels and details may be withheld from the user if the user is not authorized to receive those details. This assistance data may also enable the user to tag the phone at doorways and open doors for which the user has authorization to enter.

Additional services may be provided, such as orienting the map based on an identified current location of the mobile device. The application may also track a user location, and may thus direct a user within the appropriate area, and may warn the user or an aspect of the location access system if the user enters an unauthorized area. As described herein, the process of determining a position of device is considered part of tracking and navigating with the device. The application may provide additional navigation and positioning functionality, such as enabling the user to search for locations such as beverage locations or bathrooms, and providing directions as the user moves through the secure location to a selected destination. This may, for example, replace the need for certain secure locations to require a host to stay with a guest, since the guest location will be tracked.

Further still, certain embodiments may provide additional security for data. Continuing with the example above, if a system is designed to prevent map and location information from being publically available, even if that information is provided to low security users, the system may automatically delete applications and data for greater data and location security. The mobile phone may be used as a tag at a door at a secure location exit. The location may further be tracked via global positioning or other location determining measurements. When the system determines that the user has left the secure location, the application and any associated location data may be automatically deleted. Such automatic deletion may be required as part of the initial installation of the application. Thus, when the user leaves the secure location, the security of map and other location information inside the secure location is protected as the data is deleted.

FIG. 1 shows one potential embodiment of a system for secure delivery of indoor positioning data and applications. System 100 of FIG. 1 includes location access server 130, mobile device 110, network access point 120, and door access control point 134. Door access control point 134 may control security systems for opening and closing door 136. Location access server 130 may control the mechanisms and background systems which enable door access control 134 to provide security by controlling access to door 136. Location access server 130 may additional provide map data, direction data, security messaging, and security identifiers to mobile device in conjunction with software for displaying this map and direction data securely.

As part of system 100, mobile device 110 may communicate with door access control point 134 using near field communication (NFC) link 112. Such a link may use any NFC communication format. NFC standards cover communications protocols and data exchange formats, and are based on existing radio-frequency identification (RFID) standards. NFC builds upon RFID systems by allowing two-way communication between endpoints and may thus enable a mobile electronic device such as a phone to have NFC as an integrated hardware system to enable a two-way, bi-directional RFID style communication link such as NFC link 112. Such a link may to make mobile device 110 work as a RFID tag or reader. Mobile phone users with NFC-enabled smartphones use such a device as a physical access cards both as a tag at security check and as a reader to get short messages. Such messages may be used to trigger various functionality at a mobile electronic device, as described in detail throughout this application. For example, one trigger may be a trigger to request download, execution, and automatic deletion of a local secure navigation and positioning module which may run as software on a mobile electronic device. Another trigger may be a separate trigger to update location assistance information as part of secure navigation and positioning module operation. It will be apparent to a person of ordinary skill in the art that a variety of other triggers may be used in different embodiments.

While NFC link 112 is for near field communications which may be limited to short distances, wireless local area network (LAN) link 114 may cover a much wider area, and enable mobile device 110 to communicate with a broader network via a network access point 120 which essentially acts as a relay point between wireless devices and another network. In certain embodiments, network access point may be limited to enabling communications with location access server 130. In other embodiments, network access point 120 may be a connection to a wide area network, or more broadly, to the Internet. Link 122 may thus either be a local network connection, a wide area network connection, or may be a link over the Internet to a remotely located server.

Location access server 130 may thus be locally positioned near the physical location for which access is controlled, or location access server 130 may be located remotely. Similarly, link 132 may be a network connection to enable location access server 130 to communicate with door access control point 134. In alternate embodiments, door access control point 134 may not be coupled to location access server 130, but may simply provide information to mobile device 110 regarding how to access location access server 130.

Thus, in certain embodiments, location access server 130 may control both location assistance direction information provided to mobile device 110 and may also control location access by managing door access control points such as door access control point 134. In alternative embodiments, this functionality may be split, such that different server computers handle different tasks. In further alternative embodiments, door access control points may include computing devices which include instructions for operating independently to control door access.

Figure 2:
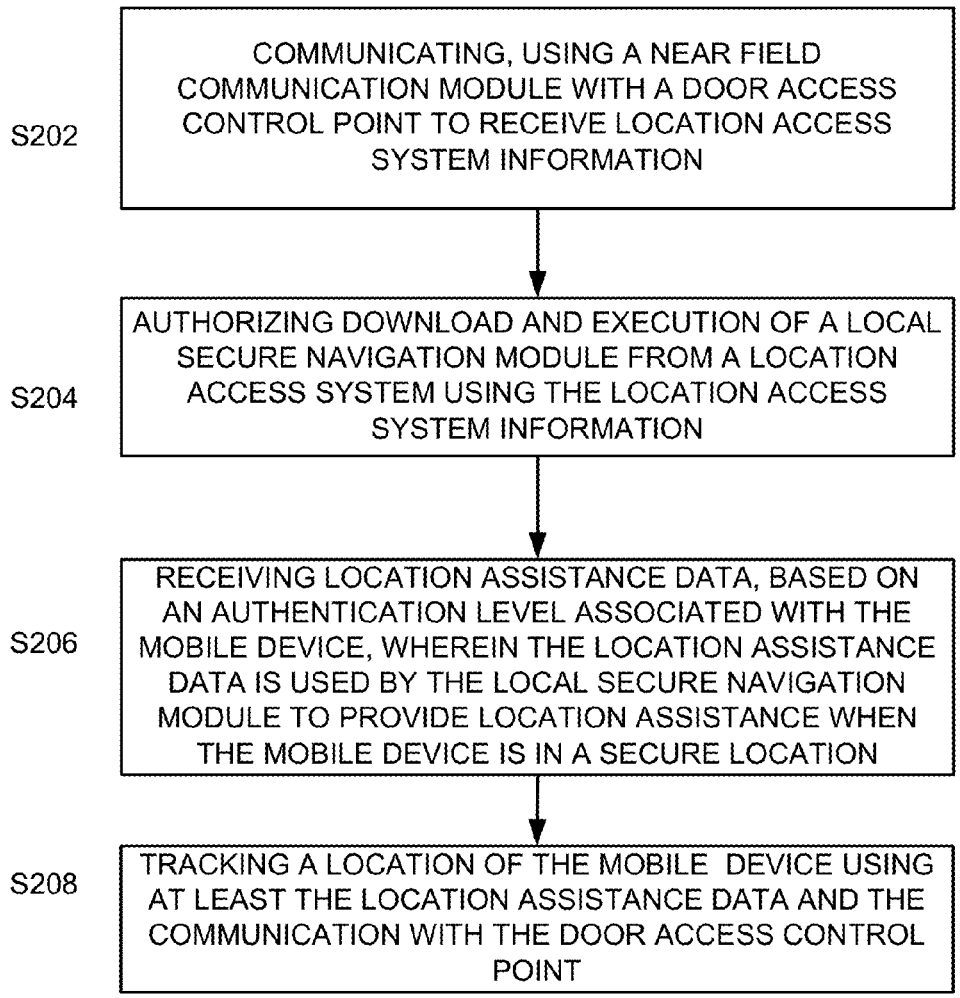
FIG. 2 illustrates a method according to one potential embodiment.

FIG. 2 now describes one potential embodiment for providing secure location data in accordance with the embodiment system 100 of FIG. 1. While such a method is described in the context of FIG. 1, it will be understood that alternative systems and structures may implement such a method in accordance with various embodiments.

As shown by FIG. 2, in S202, a near field communication module of a mobile device such as mobile device 110 may communicate with a door access control point 134 to receive location access system information for authorization to enter a secure location. Such a communication may be initiated by a one way communication of identifying information to request a door access control point 134 to open door 136. Door access control point 134 may communicate with location access server 130 to determine whether to open the door or not. Alternatively, the door access control point 134 may include circuitry for independently determining whether or not to open. As a further part of the communication of S202, the door access control point 134 may communicate location access system information to mobile device 110. Such information may include an internet protocol (IP) address, a web address, a uniform resource locator (URL) or some other means of directing mobile device 110 to location access server 130. In alternative embodiments, the location access system information may be a small executable program.

In S204, then the mobile device 110 may authorize the download and execution of a location navigation module. Such authorization may comprise a prompt from a web browser of mobile device 110, or may be an execution control message from a small executable received via NFC. Such authorizing may be approved by a real time user input response, or may be pre-approved by user settings to automatically accept the module at mobile device 110. In one potential embodiment, the door access control point 134 may be a point in a lobby to enable user registration. As part of such an embodiment, the user may provide identification, a point of contact, or other security information. Such information may be used to identify the user, and to assign a security level to the user along with an identifier which may be associated with the user's mobile device 110. In alternative embodiments, a security camera picture, remote analysis of a user's biometric characteristics, or any other such system may be used to identify an access level and to associate an identification or identification number with a user and the user's associated mobile device.

In S206, the mobile device may then receive location assistance data based on the authentication level. Such information may be communicated to mobile device 110 using a wireless network via network access point 120. In alternative embodiment, any network connection may be used. Such location assistance data may be map data, text based directions, voice directions, or any other such information. This information may be tailored or limited based on the associated access level. For example, specific details of certain restricted areas may be excluded from provided map information. Alternatively, or in conjunction with this, certain areas may be marked as restricted in the provided location information.

The information may further include identification of a variety of points of interest which may be displayed using a map and output display function of the local secure navigation module which may be executed by the mobile device 110. The location assistance data may then enable a user to select a point of interest, and to receive directions from a current device location to the point of interest. In S208, a current location of the mobile device may be tracked using the location assistance data in conjunction with a location identified by the communication with the door access control point 134. Tracking of the mobile device 110 may thus be used in determining a current location for providing a reference on map information, and as a starting point for any directions to an end location or point of interest. The communication with the door access control point 134 may function both to provide the module which uses such data, and to act as a point of reference for calibrating, confirmation, or otherwise providing location information to a user when or shortly after a user initiates a NFC with door access control point 134.

Figure 3:
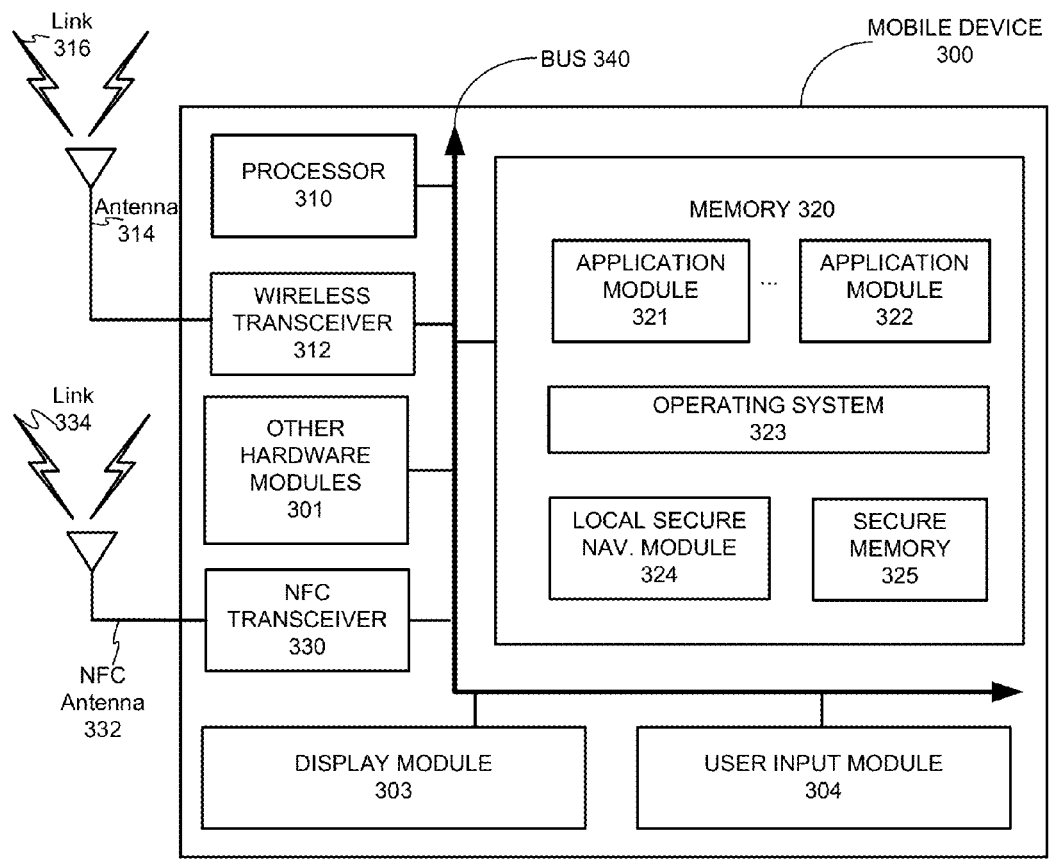
FIG. 3 is one potential example of a mobile device for use with a potential embodiment.

FIG. 3 may then describe a particular embodiment of a mobile device such as mobile device 110 of FIG. 1. Mobile device 300 includes a processor 310, a memory 320, and a near field (NFC) transceiver 330. Such elements may function as described in the method of FIG. 2 to authorize the download and execution of a local secure navigation module 324 via NFC transceiver 330 over NFC antenna 332 and link 334 to a door access control point such as door access control point 134. Mobile device 300 may thus include an interface for receiving information via NFC antenna 332 and NFC transceiver 330 that may identify a network location for accessing local secure navigation module 324. Such communications received via NFC transceiver 330 may additional request a user input, via user input module 304 for example, that may authorize and request download and execution of local secure navigation module 324 from the identified remote server computer.

In the embodiment shown at FIG. 3, mobile device 300 includes processor 310 configured to execute instructions for performing operations at a number of components and can be, for example, a general-purpose processor or microprocessor suitable for implementation within a portable electronic device. Processor 310 is communicatively coupled with a plurality of components within mobile device 300. To realize this communicative coupling, processor 310 may communicate with the other illustrated components across a bus 340.

Bus 340 can be any subsystem adapted to transfer data within mobile device 300. Bus 340 can be a plurality of computer buses and include additional circuitry to transfer data.

Memory 320 may be coupled to processor 310. In some embodiments, memory 320 offers both short-term and long-term storage and may in fact be divided into several units. Memory 320 may be volatile, such as static random access memory (SRAM) and/or dynamic random access memory (DRAM) and/or non-volatile, such as read-only memory (ROM), flash memory, and the like. Furthermore, memory 320 can include removable storage devices, such as secure digital (SD) cards. Thus, memory 320 provides storage of computer readable instructions, data structures, program modules, and other data for mobile device 300. In some embodiments, memory 320 may be distributed into different hardware modules.

In some embodiments, memory 320 stores a plurality of application modules 321 through 322, which may be any number of applications. Application modules contain particular instructions to be executed by processor 310. In alternative embodiments, other hardware modules 301 may additionally execute certain applications or parts of applications 321-322. On particular example of an application may be local secure navigation module 324. In certain embodiments, memory 320 may additionally include secure memory 325, which may include additional security controls to prevent copying or other unauthorized access to secure information, such as any may or location assistance information identified as secure in conjunction with secure navigation module 324.

In some embodiments, memory 320 includes an operating system 323. Operating system 323 may be operable to initiate the execution of the instructions provided by application modules 321-322 and/or manage other hardware modules 301 as well as interfaces with communication modules which may use wireless transceiver 312 and NFC transceiver 330. Operating system 323 may be adapted to perform other operations across the components of mobile device 300 including threading, resource management, data storage control and other similar functionality.

In some embodiments, mobile device 300 includes a plurality of other hardware modules 301. Each of other hardware modules 301 is a physical module within mobile device 300. However, while each of hardware modules 301 is permanently configured as a structure, a respective one of hardware modules 301-302 may be temporarily configured to perform specific functions or temporarily activated. A common example is an application module that may program a camera module (i.e., hardware module) for shutter release and image capture. A respective one of hardware modules 301 can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the hardware modules 301-302 may be implemented in software.

Mobile device 300 may include a component such as wireless communication module which may integrate antenna 314 and wireless transceiver 312 with any other hardware, firmware, or software necessary for wireless communications. Such a wireless communication module may be configured to receive signals from various devices such data sources via networks and access points such as network access point 120. Thus, antenna 314 and wireless transceiver 312 may receive local secure navigation module 324 from a location access server such as location access server 130 via a wireless network to securely provide local location assistance. A software module for secure navigation and any associated map data which the system is structured to keep secure may be stored in secure memory 325 and automatically deleted when a triggering event occurs, such as when location data in conjunction with secure navigation module 324 identifies that the mobile device 300 has moved out of an assistance area covered by secure navigation module 324. In alternative embodiments, data may be stored only while mobile device is within a certain room or set of rooms, and may be deleted as soon as NFC transceiver 330 communicates information to local secure navigation module 324 via processor 310 indicating that the room or set of rooms is being exited by a door controlled by a door access control point such as door access control point 134.

In addition to other hardware modules 301 and application modules 321-322, mobile device 300 may have a display module 303 and a user input module 304. Display module 303 graphically presents information from mobile device 300 to the user. This information may be derived from one or more application modules 321, one or more hardware modules 301, a combination thereof, or any other suitable means for resolving graphical content for the user (e.g., by operating system 323). Display module 303 can be liquid crystal display (LCD) technology, light emitting polymer display (LPD) technology, or some other display technology. In some embodiments, display module 303 is a capacitive or resistive touch screen and may be sensitive to haptic and/or tactile contact with a user. In such embodiments, the display module 303 can comprise a multi-touch-sensitive display.

Additional embodiments of a mobile device may further comprise various portions of computing devices as are detailed below with respect to FIG. 7 and networks as detailed in FIG. 8.

Figure 4:
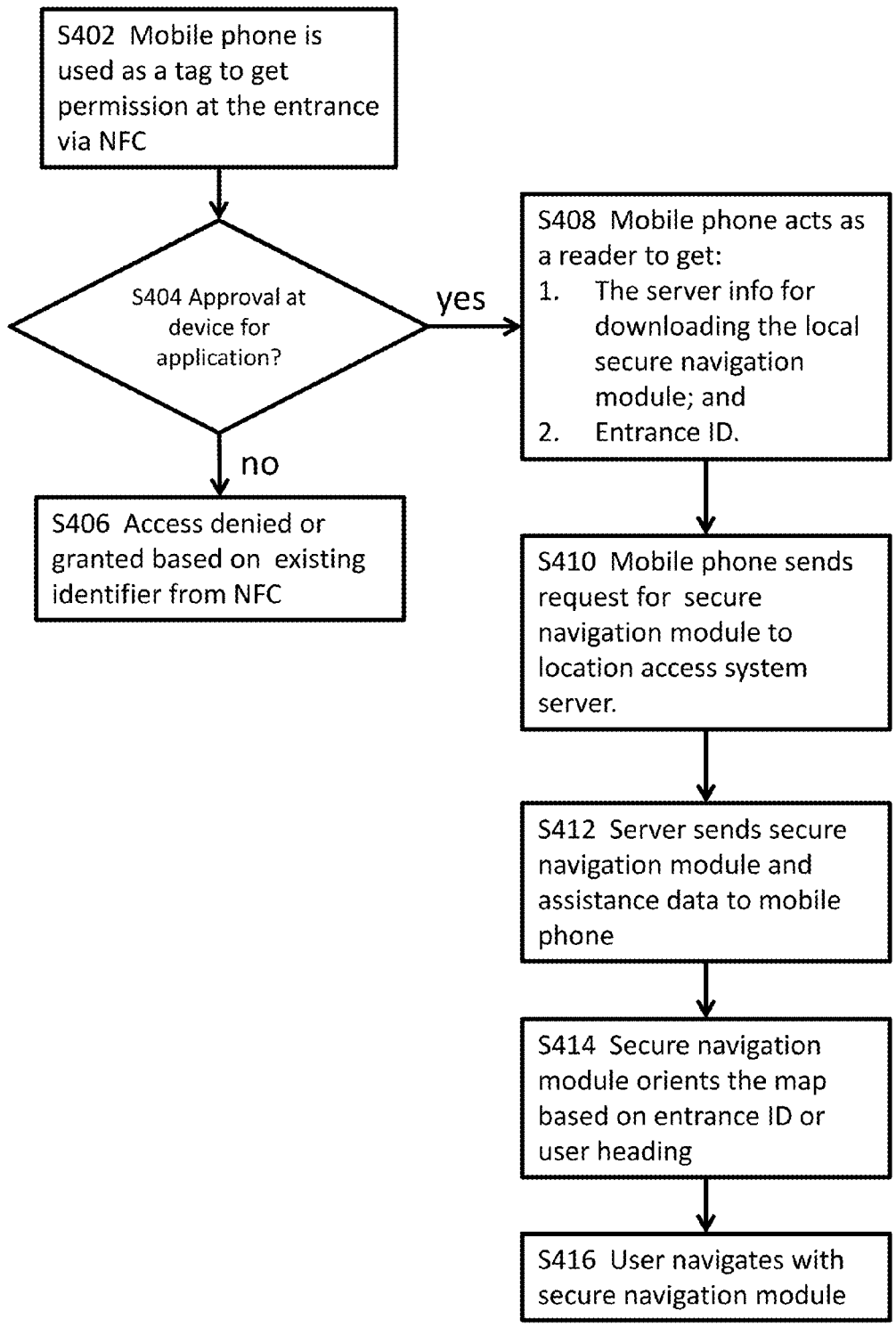
FIG. 4 illustrates a method according to one potential embodiment.

FIG. 4 describes one potential alternative embodiment for a mobile phone entering a secure location. In S402, a mobile phone is used as a tag to get permission at the entrance of a secure location via a NFC. In S404, the mobile device may provide a user approval or disapproval for installation of a secure navigation module. If use of the secure navigation module is denied, then in S406, a location access system may determine whether a user is authorized to proceed. If installation is a requirement for access, the system may deny access to any associated door, and may automatically send a communication to a security messaging service, person, or camera to highlight the situation. If the mobile phone provides an identifier via NFC that the system may use to identify the phone as associated with an authorized user, then the user may enter the door without enabling secure local navigation using a module on the phone.

If approval for the local secure navigation application is received, then in S408, the mobile phone may act as a reader to receive, via NFC, the server information for downloading the local secure navigation module and an entrance ID. The entrance ID may be an identifier that enables the mobile phone to associate the door access control point that is in communication via NFC with a map location, so that the NFC may be used as a reference in determining the location of the phone. In certain embodiments when a phone is making an initial contact with the access system, an additional special user ID may be assigned as an identifier along with the downloading of the module to integrate the phone and user IDs with the secure navigation implemented by the local secure navigation module. This number may then both be provided to door access control points and to any additional location measurements services operating through a network or in conjunction with global positioning measurements to take location measurements and provide related location information to an access control server or other location assistance server that may provide directions, maps, or other assistance to a user of the mobile phone. In other embodiments, such as those mentioned above where the phone provides an inherent identification, then the user ID may be unnecessary, and the phone may simple receive the entrance ID for use in establishing a current location reference point to the fixed physical location of the door.

In S410, then, the mobile phone sends the request for the local secure navigation module to the identified location access system server. This server may essentially be a web server or content repository with no other function than to store and provide the objects used in the secure navigation module. In other embodiments, this server may integrate door security, navigation assistance, map data updates, or any other such information. In S412, the server sends the secure navigation module and assistance data to the mobile phone. In S414, the secure navigation module orients a map for display on the mobile phone. This may be done using the entrance ID to fix the phone location to the physical location of the door and/or associated door access control point. This may alternatively be done using other measurement means, such as round trip time (RTT) measurements to a network access point, received signal strength indication (RSSI) measurements to access points, frame based time measurements from access points, assisted global positioning system measurements, change from point of reference measurements using movement detectors in a phone, or any other such systems for setting a user location with map, assistance, or location information. In various embodiments, multiple such location systems or measurements may be used at any given time.

In S416, then, the user may navigate using the secure navigation module based on the oriented setting and any map, sound, or text display that may be used to provide location and/or directions.

Figure 5:
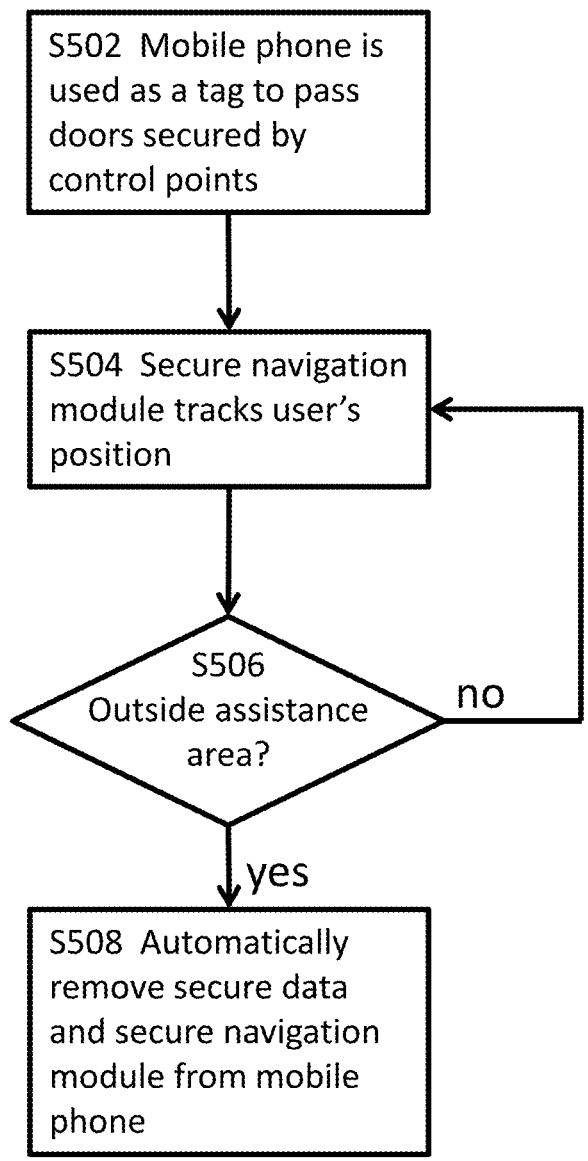
FIG. 5 illustrates a method according to one potential embodiment.

FIG. 5 illustrates an additional alternative embodiment. In S502, the mobile phone may be used as a tag to pass doors secured by a door access control point. In S504, a system may track a user's position. In certain embodiments, tracking or extra tracking may be initiated with a phone tag is made at a door identified as an "exit" door. This may be done as part of additional data security to prevent distribution of secure data.

In S506, the system checks to determine if the mobile phone is outside of an assistance area. If the phone is not outside the assistance area, then the system may continue to S504 to monitor the user's position. If the user returns inside to an area without an exit, this monitoring may be reduced or ended. If the phone leaves the assistance area, then in S508, the system may automatically remove secure data and the local secure navigation module from the phone.

The assistance area for the purposes of different embodiments may vary. In certain embodiments, a certain distance from a door, building, or general area may be monitored. In certain embodiments, the area may be defined by how recently the phone communicated with a secure access system. For example, if the phone has not communicated with the secure access system in 10 minutes, the local secure navigation module may be automatically deleted. In further embodiments, the area may be defined by a number of door actions. If the user is authorized only to enter and exit, or to enter one door and exit via another door, then the local secure navigation module may delete as soon as the phone is tagged at the exit. This may prevent a user from tagging at a door pretending to exit, then using another internal door. In still further embodiments, the area may be specifically time limited, such that after a certain amount of time regardless of use, the local secure navigation system deletes itself. In various embodiments, the access control server or an associated security server may keep a record of movement, door access, and accesses assistance and map data provided to a particular mobile device.

Figure 6:
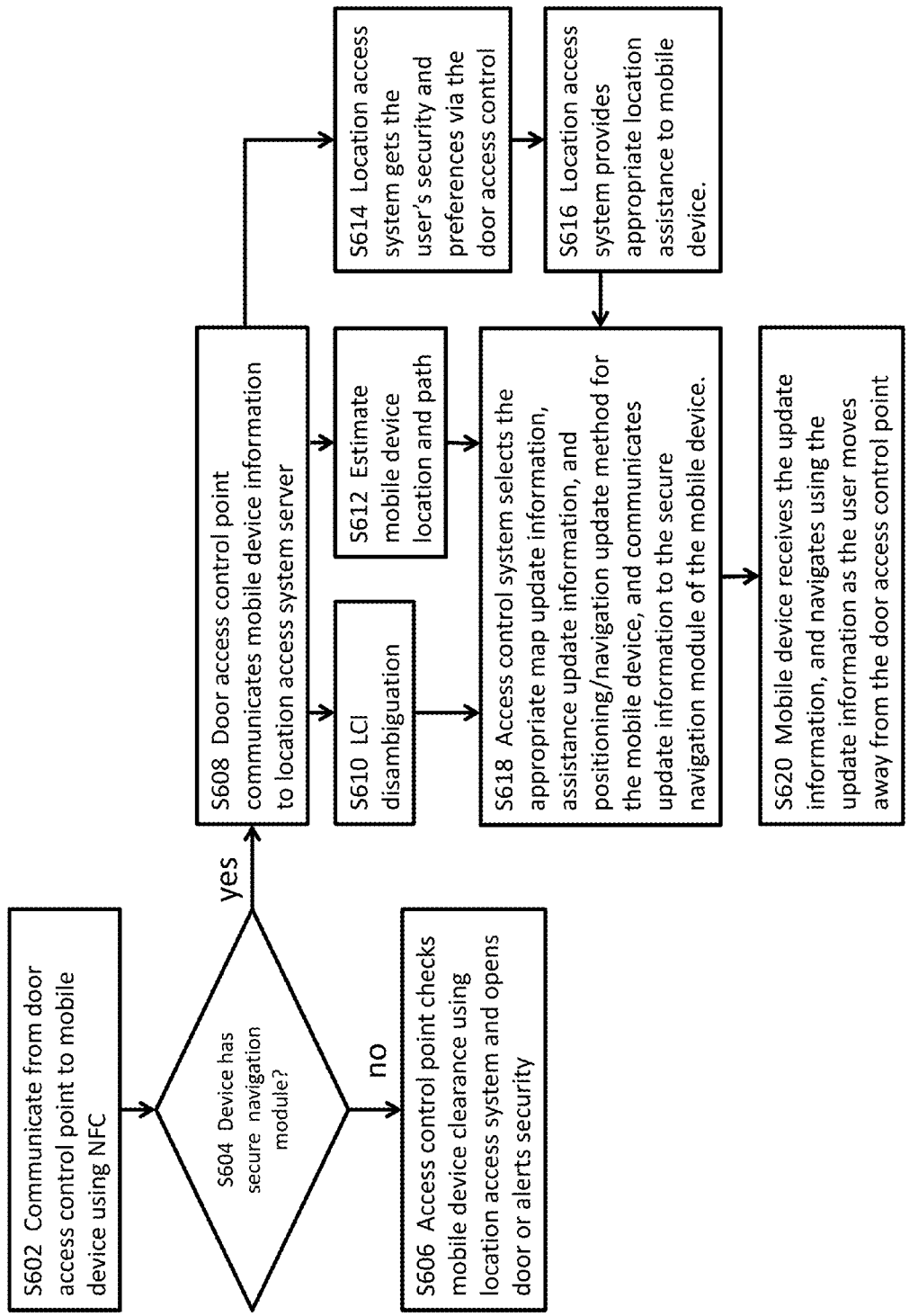
FIG. 6 illustrates a method according to one potential embodiment.

FIG. 6 provides still another embodiment of a method. In S502, a communication occurs from a door access control point to a mobile device using NFC. In S604, an access control system may check a device status. If the mobile device does not have the navigation module, the access control system may check a security clearance for the mobile device, and either open a door associated with the access control point, decline to open the door, provide a prompt to the user, alert security, or take another such response to the communication. In S608, if the mobile device does have the local secure navigation module, then the door access control point communicates mobile device information to a location access system server. Essentially, the RFID reader gets the portable computing device's permission and device information, and sends this information to the location access server with its own location indicator (LCI). This may be an ID associated with the door control access point or RFID reader which is associated with a fixed location, as described above. In various embodiments, this may be done by a direct connection from the access control point to the location access server. In alternative embodiments, this communication may be made via the user's mobile device and a network access point to the location access server.

In addition, a mobile device may also communicate to the location assistance services regarding its device specifics, such as Wifi receiving/transmitting capability, Bluetooth capability, sensor accuracy, storage size, display resolution, or other such characteristics of the mobile device. A location access server or related systems may then use this device information to choose the most accuracy and efficient methods for positioning and navigation inside the building as device moving away from the entrance, and therefore the most appropriate assistance data for this device. In various embodiments, a system may choose between potential capabilities such as RSSI, RTT, Bluetooth, tracking with a device sensor such as an accelerometer, use of map tiles in a provided map based on device movement, or any other such method of tracking user movement in a fashion tailored to the specific device.

S610, S612, S614, and S616 the location access server, the control access point with an RFID reader, or any such component of the system may determine which information to use as location assistance information. In S610, the LCI information may be used, in S612, additional estimated position information may be used from other measurements of the mobile device location, and in S614, the security levels or user preferences are considered for determining assistance information to be used by the local secure navigation module. In S614, the determined security levels and preferences are identified to provide and filter appropriate location assistance information in communicating with the mobile device, identify various parts of this communication as well as certain responses.

In S618, this information from S610-S616 is used to select the correct map information to send based on location. The information from S610-S616 is also used to select the correct map tiling with the correct level of details for security, and also to provision any positioning and navigation through the location access server. This may include RTT measurements, RSSI measurements, GPS measurements, or other measurements that may be made by network or other elements controlled by the location access system. Any update information may then be communicated to the mobile device. Because the local secure navigation module is already operating on the mobile device, it may have certain data already. The update information may either be structured as a difference between existing data and the updated new data, or as a complete download of new data with previous assistance data deleted or overwritten.

In S620, then the mobile device receives the update information. The mobile device may then use the update information in conjunction with the operation of the local secure navigation module as the user moves away from the door access control point.

Figure 7:
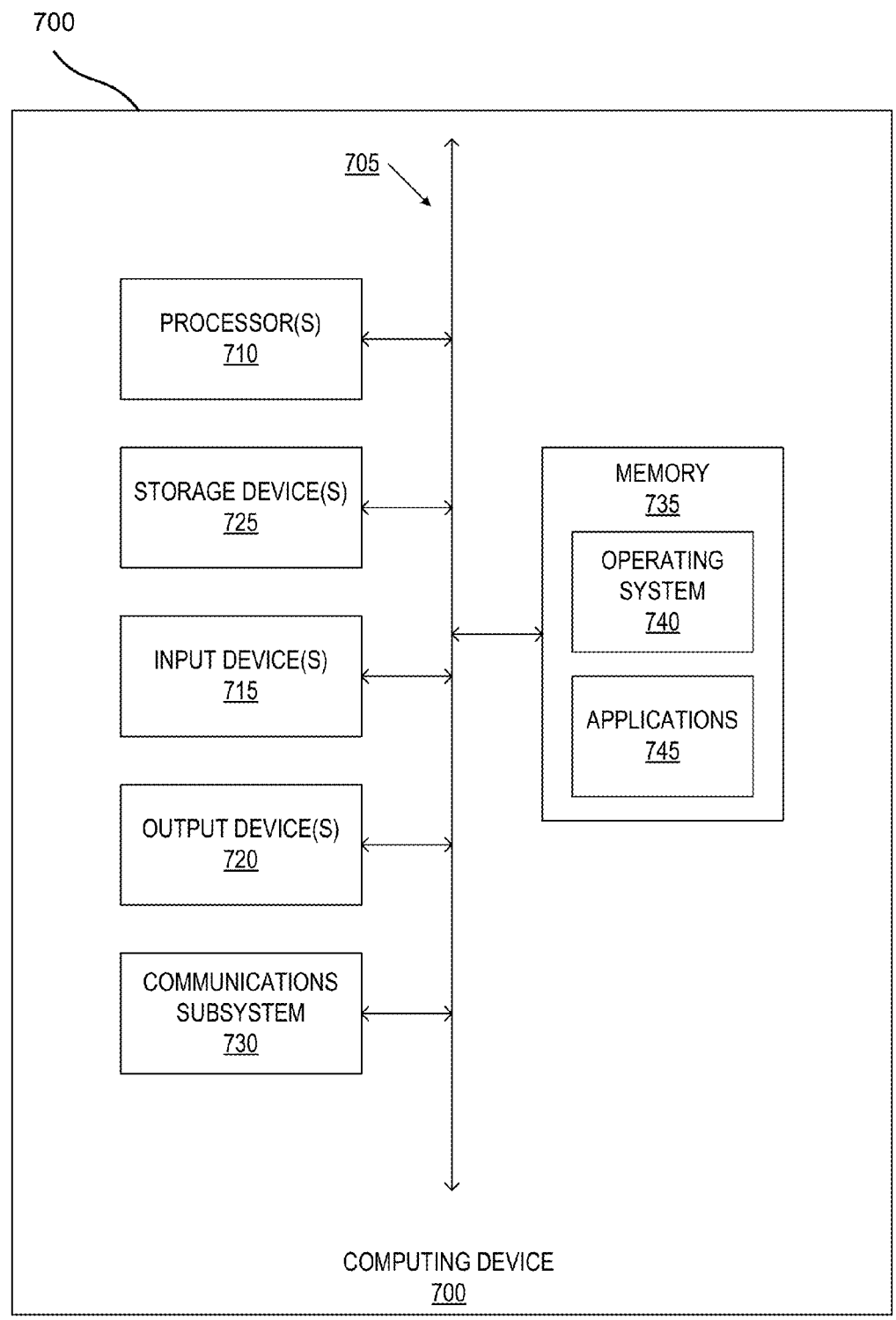
FIG. 7 is one potential implementation of a computer device according to certain embodiments.
Figure 8:
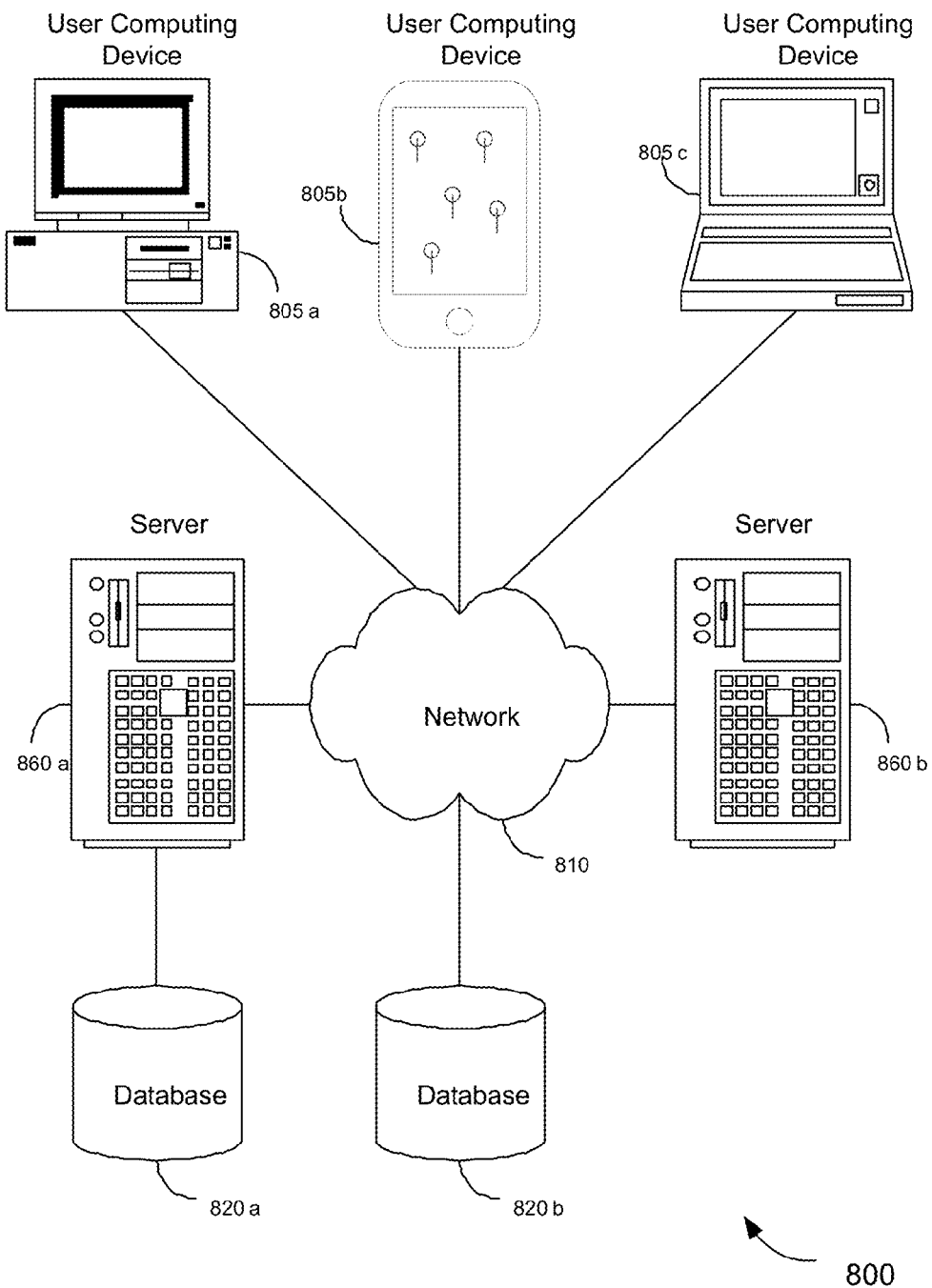
FIG. 8 is one potential implementation of a networked computer system according to certain embodiments.

FIG. 7 illustrates an example of a computing system in which one or more embodiments may be implemented. A computer system as illustrated in FIG. 7 may be incorporated as part of the previously described computerized devices in FIGS. 1 and 3. Additionally, any computing device as described herein may include any combination of components. For example, any of mobile device 110, location access server 130, network access point 120, door access control point 134, or mobile device 300 may be structured according to the embodiment of computing device 700 of FIG. 7 or any element of computing device 700. Additionally, in various embodiments, elements or components of a system may be structured as any functional mix of computing elements described herein, such that any function or functions of any device described herein may be implemented by multiple computing devices similar to computing device 700, or any combination of elements of computing device 700.

FIG. 7 provides a schematic illustration of one embodiment of a computing device 700 that can perform the methods provided by various other embodiments such as the embodiments described by FIGS. 2, 4, 5, and 6 as described herein. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computing device 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computing device 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computing device 700 might also include a communications subsystem 730, which can include without limitation a modem, a network card (wireless or wired), an infrared communication device, a wireless communication device and/or chipset (such as a Bluetooth™ device, an 702.11 device, a Wi-Fi device, a WiMax device, cellular communication facilities, etc.), and/or similar communication interfaces. The communications subsystem 730 may permit data to be exchanged with a network (such as the network described below, to name one example), other computer systems, and/or any other devices described herein. A mobile device such as mobile device 300 may thus include other communication subsystems in addition to those including wireless transceiver 312 and NFC transceiver 330.

In many embodiments, the computing device 700 will further comprise a non-transitory working memory 735, which can include a RAM or ROM device, as described above. The computing device 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computing device 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computing device 700 and/or might take the form of source and/or installable code, which, upon compilation and/or installation on the computing device 700 (e.g., using any of a variety of generally available compilers, installation programs, compression/decompression utilities, etc.) then takes the form of executable code. Local secure navigation module 324 may thus be executable code as described herein.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an activity selection subsystem configured to provide some or all of the features described herein relating to the selection of activities by a context assistance server 140 can comprise hardware and/or software that is specialized (e.g., an application-specific integrated circuit (ASIC), a software method, etc.) or generic (e.g., processor(s) 710, application programs 745, etc.) Further, connection to other computing devices such as network input/output devices may be employed.

Some embodiments may employ a computer system (such as the computing device 700) to perform methods in accordance with the disclosure. For example, some or all of the procedures of the described methods may be performed by the computing device 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code. Any such memory may function as memory 320 or as secure memory 325 if structured to maintain security of stored content.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 700. These signals, which might be in the form of electromagnetic signals, acoustic signals, optical signals and/or the like, are all examples of carrier waves on which instructions can be encoded, in accordance with various embodiments.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a non-transitory storage device 725 either before or after execution by the processor(s) 710.

In various embodiments as described herein, computing devices may be networked in order to communicate access information to open doors such as door 136 and while checking security. Such devices may additionally be networked to communicate direction information and location assistance data. For example links 316, 334, 122, 132, and 114 may all be network links for such purposes. FIG. 8 illustrates a schematic diagram of a system 800 of networked computing devices that can be used in accordance with one set of embodiments. The system 800 can include one or more user computing devices 805. The user computing devices 805 can be general purpose personal computers (including, merely by way of example, personal computers and/or laptop computers running any appropriate flavor of Microsoft Corp.'s Windows and/or Apple Corp.'s Macintosh operating systems) and/or workstation computers running any of a variety of commercially-available UNIX™ or UNIX-like operating systems. These user computing devices 805 can also have any of a variety of applications, including one or more applications configured to perform methods of the invention, as well as one or more office applications, database client and/or server applications, and web browser applications. Alternatively, the user computing devices 805 can be any other electronic device, such as a thin-client computer, Internet-enabled mobile telephone, and/or personal digital assistant (PDA), capable of communicating via a network (e.g., the network 810 described below) and/or displaying and navigating web pages or other types of electronic documents. Although the exemplary system 800 is shown with three user computing devices 805, any number of user computing devices can be supported.

Certain embodiments of the invention operate in a networked environment, which can include a network 810. The network 810 can be any type of network familiar to those skilled in the art that can support data communications using any of a variety of commercially-available protocols, including, without limitation, TCP/IP, SNA, IPX, AppleTalk, and the like. Merely by way of example, the network 810 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth protocol known in the art, and/or any other wireless protocol; and/or any combination of these and/or other networks.

Embodiments of the invention can include one or more server computers 860. Each of the server computers 860 may be configured with an operating system, including, without limitation, any of those discussed above, as well as any commercially (or freely) available server operating systems. Each of the server computers 860 may also be running one or more applications, which can be configured to provide services to one or more user computing devices 805 and/or other server computers 860.

Merely by way of example, one of the server computers 860 may be a web server, which can be used, merely by way of example, to process requests for web pages or other electronic documents from user computing devices 805. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computing devices 805 to perform methods of the invention. Such servers may be associated with particular IP addresses, or may be associated with modules having a particular URL, and may thus store secure navigation modules such as local secure navigation module 324 for retrieval by a mobile device in various embodiments.

The server computers 860, in some embodiments, might include one or more application servers, which can include one or more applications accessible by a client running on one or more of the user computing devices 805 and/or other server computers 860. Merely by way of example, the server(s) 860 can be one or more general purpose computers capable of executing programs or scripts in response to the user computing devices 805 and/or other server computers 860, including, without limitation, web applications (which might, in some cases, be configured to perform methods of the invention). Merely by way of example, a web application can be implemented as one or more scripts or programs written in any suitable programming language, such as Java™, C, C# or C++, and/or any scripting language, such as Perl, Python, or TCL, as well as combinations of any programming/scripting languages. The application server(s) can also include database servers, including without limitation those commercially available from Oracle™, Microsoft™, Sybase™ IBMT™, and the like, which can process requests from clients (including, depending on the configurator, database clients, API clients, web browsers, etc.) running on a user computing device 805 and/or another server computer 860. In some embodiments, an application server can create web pages dynamically for displaying the information in accordance with embodiments of the invention, such as information displayed on web browser 106 in FIG. 1. Data provided by an application server may be formatted as web pages (comprising HTML, Javascript, etc., for example) and/or may be forwarded to a user computing device 805 via a web server (as described above, for example). Similarly, a web server might receive web page requests and/or input data from a user computing device 805 and/or forward the web page requests and/or input data to an application server. In some cases a web server may be integrated with an application server.

In accordance with further embodiments, one or more server computers 860 can function as a file server and/or can include one or more of the files (e.g., application code, data files, etc.) necessary to implement methods of the invention incorporated by an application running on a user computing device 805 and/or another server computer 860. Alternatively, as those skilled in the art will appreciate, a file server can include all necessary files, allowing such an application to be invoked remotely by a user computing device 805 and/or server computer 860. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 860a (and/or a user computing device 805). Alternatively, a database 820b can be remote from any or all of the user computing devices 805 or server computers 860, so long as the database 820b can be in communication (e.g., via the network 810) with one or more of these. In a particular set of embodiments, a database 820 can reside in a storage-area network ("SAN") familiar to those skilled in the art. (Likewise, any necessary files for performing the functions attributed to the user computing devices 805 or server computers 860 can be stored locally on the respective computer and/or remotely, as appropriate.) In one set of embodiments, the database 820 can be a relational database, such as an Oracle™ database, that is adapted to store, update, and retrieve data in response to SQL-formatted commands. The database might be controlled and/or maintained by a database server, as described above, for example. Such databases may store information relevant to levels of security, which users may access certain levels of security, which map details may be included in certain maps of a security level, or any other such details which may be used as part of location assistance or location access data.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application various embodiments.

Also, a number of steps may be undertaken before, during, or after the above elements are considered.

What is claimed is:

1. A method, on a mobile device, comprising:
communicating, using a near field communication module with a door access control point to receive location access system information;
authorizing download and execution of a local secure navigation module from a location access system using the location access system information;
receiving location assistance data, based on an authentication level associated with the mobile device, wherein the location assistance data is used by the local secure navigation module to provide location assistance when the mobile device is in a secure location; and
tracking a location of the mobile device using at least the location assistance data and the communication with the door access control point.

2. The method of claim 1 further comprising:
receiving an identification associated with the location access system and the authentication level associated with the mobile device.

3. The method of claim 2 further comprising:
communicating, using the near field communication module, the identification to the door access control point, associated with a first door of the secure location, to open the first door.

4. The method of claim 2 further comprising:
communicating, using the near field communication module of the mobile device, the identification to a second door access control point associated with a second door of the secure location to request the second door to open; and
receiving an indication that access to an area behind the second door is denied to due to an insufficient authorization level.

5. The method of claim 1 wherein receiving the location assistance data based on the authentication level comprises receiving a map with a level of detail that matches the authentication level, wherein a higher authentication level is associated with a greater level of detail.

6. The method of claim 1 further comprising:
tracking, using the location access system, a travel path of the mobile device within the secure location.

7. The method of claim 1 further comprising:
determining that the mobile device is outside of an assistance area; and
automatically deleting the local secure navigation module and the location assistance data from the mobile device in response to the determining that the mobile device is outside of the secure location.

8. The method of claim 7 wherein determining that the mobile device is outside of the assistance area comprises communicating, with an exit door access control point, a request to exit a secure area.

9. The method of claim 1 further comprising:
communicating, using the near field communication module, with a second door access control point to receive second location access system information; and
receiving updated location assistance information from the location access system in response to the communication with the second door access control point.

10. The method of claim 9 wherein receiving updated location assistance information comprises receiving second map information for a second area; and
deleting first map information for a first area received as part of the location assistance data.

11. The method of claim 1 wherein the location access system information comprises an internet protocol address for a location system server; and
wherein receiving location assistance data at the mobile device comprises communicating with a location access server via a wireless network access point.

12. The method of claim 1 wherein tracking a location of the mobile device using at least the location assistance data and the communication with the door access control point comprises using a known location of the door access control point with network assisted positioning information from a plurality of wireless network access points to track the location of the mobile device.

13. The method of claim 1 wherein tracking a location of the mobile device using at least the location assistance data and the communication with the door access control point comprises using a known location of the door access control point and map information with accelerometer data from an accelerometer to track a location of the mobile device.

14. A mobile device comprising:
means for near field communication with a door access control point to receive location access system information;
means for authorizing download and execution of a local secure navigation module from a location access system;
means for receiving location assistance data, based on an authentication level, wherein the location assistance data is used by the local secure navigation module to provide location assistance when the mobile device is in a secure location; and
means for tracking a location of the mobile device using at least the location assistance data and the communication with the door access control point.

15. The mobile device of claim 14 further comprising:
means for receiving an identification associated with the location access system and the authentication level associated with the mobile device.

16. The mobile device of claim 14 further comprising:
means for determining that the mobile device is outside of an assistance area; and
means for automatically deleting the local secure navigation module and the location assistance data from the mobile device in response to the determining that the mobile device is outside of the secure location.

17. The mobile device of claim 16 wherein determining that the mobile device is outside of the assistance area comprises communicating, with an exit door access control point, a request to exit a secure area.

18. The mobile device of claim 14 further comprising:
means for communicating, using the near field communication module, with a second door access control point to receive second location access system information; and
means for receiving updated location assistance information from the location access system in response to the communication with the second door access control point.

19. The mobile device of claim 14 further comprising:
means for identifying a location of the door access control point and associating the location of the door access control point with the mobile device.

20. The mobile device of claim 14 further comprising:
means for communicating a set of mobile device capabilities to the location access system.

21. The mobile device of claim 20 further comprising:
means for tracking relative changes in the location of the mobile device.

22. A non-transitory computer readable instruction medium comprising computer readable instructions which, when executed by a processor in a mobile device, cause the mobile device to:
communicate, using a near field communication module, with a door access control point to receive location access system information;
authorize download and execution of a local secure navigation module from a location access system;
receive location assistance data, based on an authentication level of the mobile device, wherein the location assistance data is used by the local secure navigation module to provide location assistance when the mobile device is in a secure location; and
track a location of the mobile device using at least the location assistance data and the communication with the door access control point.

23. The non-transitory computer readable instruction medium of claim 22 further comprising instructions to communicate a set of mobile device functionality to the location access system; and
track the location of the mobile device using functionality of the mobile device communicated to the location access system as part of the set of mobile device functionality.

24. The non-transitory computer readable instruction medium of claim 22 further comprising instructions to:
communicate, using the near field communication module of the mobile device, with a second door access control point to receive second location access system information; and
receive updated location assistance information from the location access system in response to the communication with the second door access control point.

25. The non-transitory computer readable instruction medium of claim 24 wherein the updated location assistance information comprises a location of the second door access control point that provides location disambiguation for a map display of the local secure navigation module.

26. The non-transitory computer readable instruction medium of claim 22 further comprising instructions to:
identify that the mobile device is in an unauthorized location; and
communicate an alert to the location access system.

27. The non-transitory computer readable instruction medium of claim 22 further comprising instructions to:
identify a location of the door access control point in a map of the local secure navigation module.

28. The non-transitory computer readable instruction medium of claim 27 further comprising instructions to track relative motion of the mobile device using accelerometer data and update a mobile device position on the map of the local secure navigation module using the accelerometer data.

29. A mobile device comprising:
a memory;
a near field communications (NFC) transceiver coupled to the memory; and
a processor coupled to the memory and the NFC transceiver, wherein the processor is configured to:
communicate with a door access control point via the NFC transceiver to receive location access system information;
authorize download and execution of a local secure navigation module from a location access system;
receive location assistance data, based on an authentication level, wherein the location assistance data is used by the local secure navigation module to provide location assistance when the mobile device is in a secure location; and
track a location of the mobile device using at least the location assistance data and the communication with the door access control point.

30. The mobile device of claim 29 further comprising:
a wireless transceiver coupled to the processor;
wherein the processor is further configured to receive the location assistance via the wireless transceiver and to track the location of the mobile device via network assisted location measurements taken using the wireless transceiver.

31. The mobile device of claim 30 wherein the network assisted location measurements comprise round trip time measurements with at least one wireless network access point of the location access system; and
wherein the mobile device communicates a round trip time capability to the location access system prior to receiving the location assistance.

32. The mobile device of claim 29 wherein tracking the location of the mobile device using at least the location assistance data and the communication with the door access control point comprises taking a single positioning measurement of the mobile device.

33. The mobile device of claim 32 wherein the single positioning measurement of the mobile device is taken in response to a user request for position information.

* * * * *